UNITED STATES PATENT OFFICE.

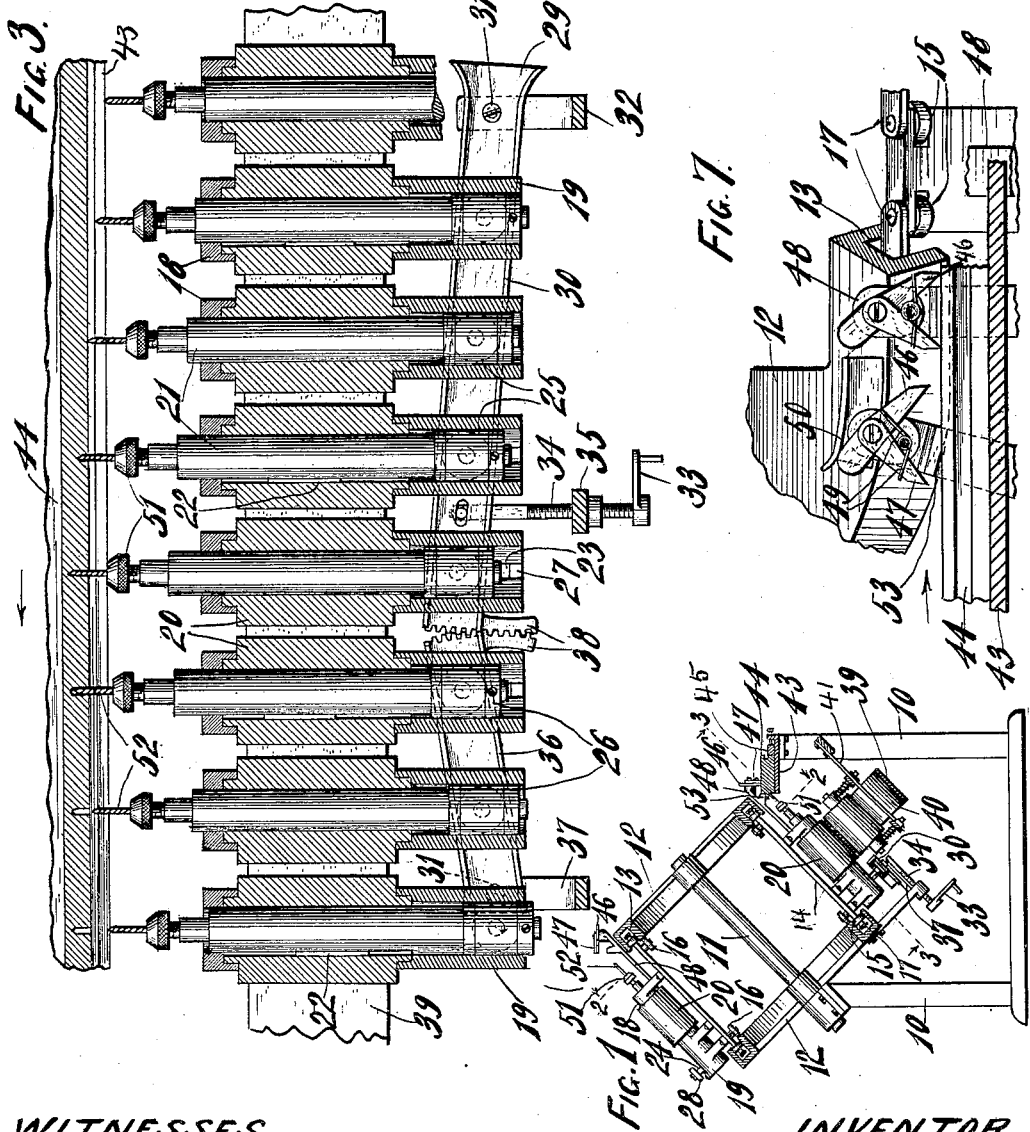

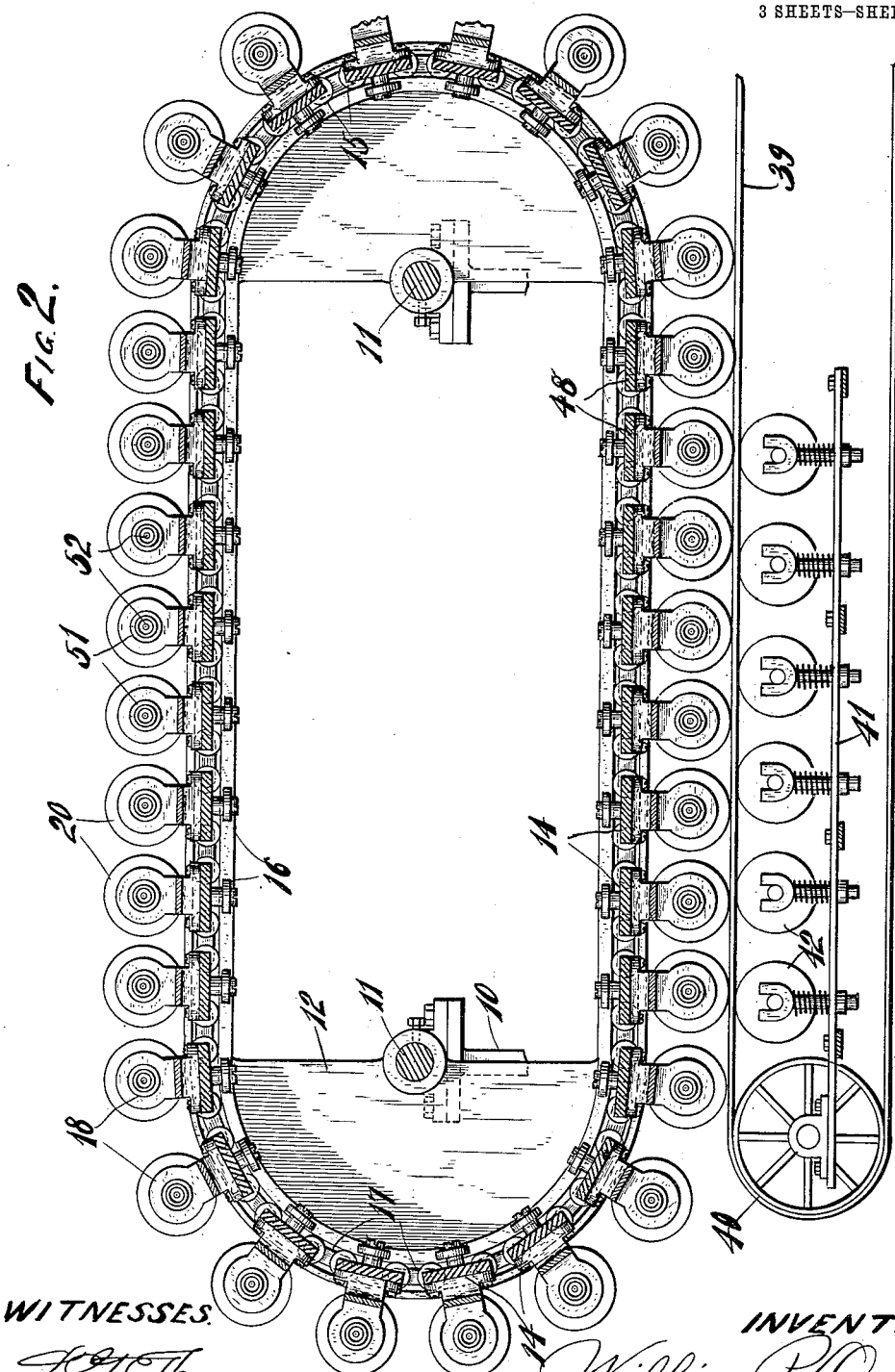

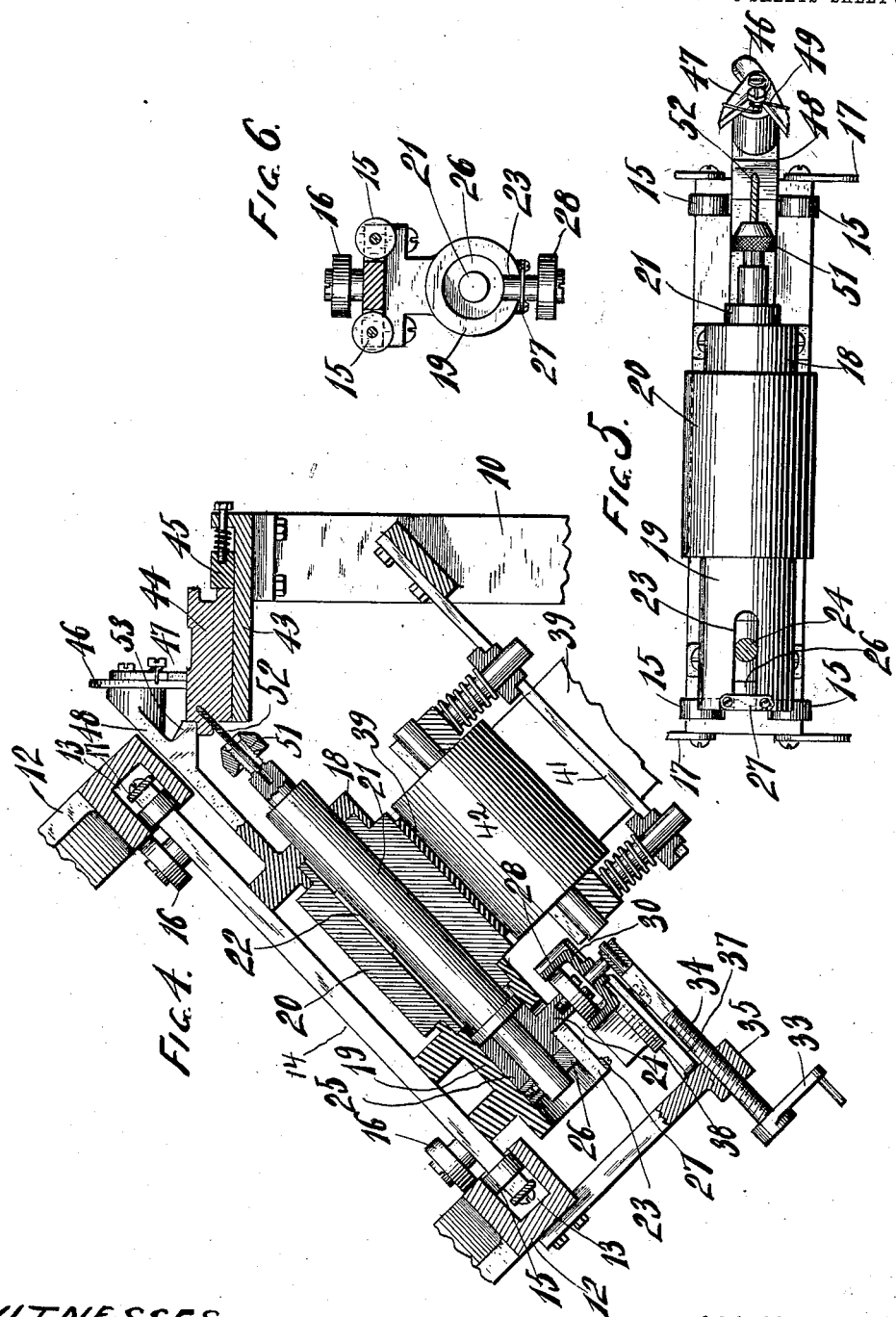

WILLIAM P. ORTH, OF MILWAUKEE, WISCONSIN.

BORING-MACHINE.

1,101,879.  Specification of Letters Patent.  Patented June 30, 1914.

Application filed October 2, 1913. Serial No. 792,933.

*To all whom it may concern:*

Be it known that I, WILLIAM P. ORTH, a citizen of the United States and resident of Milwaukee, in the county of Milwaukee and State of Wisconsin, have invented new and useful Improvements in Boring-Machines, of which the following is a description, reference being had to the accompanying drawings, which are a part of this specification.

This invention relates to machines for boring nail openings in the edge of flooring and the like and has for its object to provide drill mechanism which will follow the work in its travel and operate thereon in doing so, the movement of the drill mechanism depending upon its engagement with the work so as to be in unison with the movement of the work however the work may be fed through the machine.

One of the objects of the invention is to provide a novel form of engaging means to accomplish this correspondence in movement of the boring mechanism and the work.

Another object of the invention is to so mount the boring mechanism of the carriers that they may be readily removable so as to be replaced with others without loss of time when the drill points become worn or broken.

Another object of the invention is to provide means for adjustably varying the degree of inward movement of the boring mechanism so to control the depth of the holes drilled thereby.

With the above and other objects in view the invention consists in the boring machine as herein claimed and all equivalents.

Referring to the accompanying drawings in which like characters of reference indicate the same parts in different views Figure 1 is a sectional end elevation of a boring machine constructed in accordance with this invention; Fig. 2 is an oblique sectional plan view on the plane of line 2—2 of Fig. 1; Fig. 3 is a sectional view through a series of the drill mechanisms and the work on the plane of line 3—3 of Fig. 1; Fig. 4 is a vertical sectional view through one of the drill mechanisms and the associated parts corresponding with a part of the view shown in Fig. 1 but on a larger scale; Fig. 5 is a bottom view of such drill mechanism; Fig. 6 is an end view thereof; and, Fig. 7 is a side view of a fragment of the receiving end of the machine showing the manner in which the work-engaging dogs are brought into engagement with the work.

In these drawings 10 indicates a frame having a pair of upright standards to which are clamped inclined supporting rods 11. Each of the inclined supporting rods 11 has a pair of semi-circular plates 12 fixed on it and spaced apart and these semi-circular plates form parts of an upper and lower guide frame, the upper semi-circular plates being connected at their edges with channel shaped track members 13 which continue around the edges of the said plates to form an oval trackway as shown in Fig. 2. The two lower semi-circular plates 12 are similarly connected and constructed to produce the lower guide frame with the flanges forming its channel guideway directed toward the flanges of the other guide frame as best seen in Fig. 1.

The two guide frames 12 form a stationary oval track for a chain of drill carriers 14 in the form of plates having rollers 15 let into their side edges and fitting between the flanges of the channel tracks of the guide frames and also having rollers 16 mounted on their inner faces near their ends to bear upon the inner flanges of the channel tracks to limit endwise movement of the drill carriers, there being links 17 pivotally connecting each of the drill carriers with the adjacent drill carriers to constitute the chain formation.

Secured to each of the drill carriers is a pair of bearing brackets 18 and 19 forming the bearings for the trunnion ends of a driving roller 20. A drill spindle 21 is removably fitted through a central opening of the driving roller 20 and is keyed thereto by a feather 22 so as to turn with the driving roller and said drill spindle fits within the bore of bearing brackets 18 and 19. The bearing bracket 19 is tubular and its bore is of such diameter that the drill spindle 21 may readily pass therethrough in being entered within or removed from the driving roller 20. It is provided with a slot 23 into which passes the projecting arm 24 of a loose sleeve 25 around the reduced lower end of the drill spindle, such loose sleeve being confined on the end of the spindle by means of a set collar 26. Accidental withdrawal of the drill spindle is prevented by means of a pivoted hook shaped crosspiece 27 closing the end of the slot 23 against the passage of the arm 24. At its end the arm 24 carries a roller 28 which during the lower straight-line travel of the drill carrier in its orbit of travel enters the flaring mouth portion 29 of a channel-shaped drill feed guide 30 which is pivotally mounted at 31 on a bracket 32 secured to the lower track frame.

The drill feed guide 30 is oblique with relation to the direction of travel of the drill carriers so that the travel of the roller 28 between the flanges thereof causes a longitudinal movement of the drill spindle through its driving roll 20. The angularity in position of the drill feed guide 30 with relation to the line of travel of the drill carriers is adjustable by the turning of a crank 33 on a screw stem 34 which is threaded through a bracket 35 like bracket 32 and has a connection with the drill feed guide 30 near its inner end. A drill return guide 36 of channel construction similar to the drill feed guide 30 is pivotally mounted on bracket 37 similar to brackets 32 and 35 and is made to change its position with the change in position of the drill feed guide 30 by having a segmental gear connection 38 therewith at their meeting ends. Thus the drill spindles which are advanced longitudinally during the travel of the rollers 28 through the drill feed guide 30 are returned during the travel of the rollers through the drill return guide 36. The latter is preferably made shorter than the guide 30 in order that the return of the drill spindles may be more rapidly accomplished. During the active portion of the travel of the drill carriers, that is, during their lower straight-line travel the drill spindles are caused to rotate by having their driving rollers 20 engage a driving belt 39 which is carried around suitable pulleys 40, one of which is shown in Fig. 2. The pulleys 40 are mounted in bearings on an oblique frame 41 which is supported by other standards of the frame 10 and the upper bight of the belt is held in contact with the driving rollers 20 of the traveling carriers by means of spring pressed rollers 42 mounted on said frame 41 as shown in Figs. 2 and 4.

The standards of the frame 10 which support the frame 41 also support a work guide or table 43 on which is carried the work 44 which may be strips of flooring or the like. The work may be forced endwise by hand or otherwise along the table 43 and against guide 45 and in its travel it is engaged by dogs 46 and 47 carried by projecting arms 48 on the bearing brackets 18 of each of the drill carriers. These dogs 46 and 47 are pivotally mounted on the ends of the arms 48 and extend obliquely in opposite directions with their lower ends pointed to bite into the work and a spring 49 on a screw between the dogs engages each of the dogs with one of its ends and tends to pull them together to increase their biting engagement with the work. Just before the dogs engage the work at the beginning of the active part of the travel of the drill carriers the dog 46, which has a rounded end projecting above the pivotal connection, engages a cam 50 on the guide frame by means of such projection and is thereby caused to move away from the dog 47 and is held in this position as shown in Fig. 7 by the cam 50 until dog 47 has engaged the work. When the end of dog 46 passes the cam 50 the spring 49 throws it forcibly downward into engagement with the work so that the drill carriers have a firm and secure connection with the work to cause them to travel with the work and at the same speed.

The upper end of each drill spindle 21 is provided with a drill chuck 51 for clamping a drill point 52 in the usual manner and during the forward or the endwise advance movement of the drill spindle, caused by the travel of the roller 28 through the drill feed guide 30, the drill point 52 is carried obliquely into the edge of the work, preferably at the angle of the tongue on the work, if matched flooring or the like is being operated upon. The arm 48 of each drill carrier has a lug 53 to engage the upper angle of the tongue of the work and thus resist the upward pressure of the drill points tending to lift the work.

In operation the belt 39 is driven in any suitable manner and causes the rotation of the drill spindles. The work is fed by hand or otherwise along the table 43 with its face down and its grooved edge against the guide 45 and the engagement of the dogs 46 and 47 of the drill carriers causes the chain of drill carriers to move at the same speed as the work, the drill spindles being forced upwardly so as to advance the drill points into the work by the engagement of the rollers 28 in the drill feed guide 30 and this is continued to such a depth as is desired and as controlled by the adjustment of the drill feed guide 30 by means of the screw 34. The drill spindles then recede from the work during the travel of the rollers 28 through the guide 36. The drills are thus caused to travel with the work and enter therein to the desired extent to form the nail holes which will permit of the flooring being nailed in place without danger of the nails splitting the wood. With this machine the nail holes are cut without subjecting the drill points to a lateral strain and they may be positioned sufficiently close together to assure of there being one hole for each joist crossed by the strip of flooring.

Should a drill point become worn or broken it is a very easy matter to replace it without seriously delaying the operation of the machine, for it is only necessary to swing the crosspiece 27 from its position across the slot 23 and then withdraw the entire drill spindle when another drill spindle already provided with a fresh drill point may be slipped in place and locked, or the same drill spindle may have its drill point renewed and then be replaced. The adjustability of the drill feed guide is a very desirable feature as it permits the depth of the openings drilled to be increased or diminished as desired without the necessity for stopping the operation of the machine.

The construction of the work engaging dogs is such that there can be no slippage between the work and the drill carriers and consequently the liability to the breaking of drill points is reduced to a minimum.

What I claim as new and desire to secure by Letters Patent is:

1. A boring machine, comprising a pair of stationary guide frames having opposite channel tracks therein forming an oval shaped guideway, drill carriers pivotally connected together to form a chain and having rollers at their ends fitting within the channel tracks, rollers on the drill carriers bearing against the inner faces of the guide frames, spindles slidably mounted on the drill carriers, drill points on the spindles, means for turning the spindles, means for moving the spindles longitudinally, and a work support for supporting work in the path of travel of the drill points.

2. A boring machine, comprising a suitably mounted traveling drill carrier provided with bearing brackets, a suitably driven driving member journaled between the bearing brackets, a spindle slidably mounted through the bearing brackets and the driving member and keyed to the driving member, a drill point on the spindle, a sleeve on the spindle having an arm passing through a slot of one of the bearing brackets, a removable stop for preventing the removal of the arm from the slot, a guide oblique to the direction of travel of the drill carrier engaging the arm for moving the spindle longitudinally, and a work support for supporting work in the path of travel of the drill point.

3. A boring machine, comprising a suitably mounted traveling drill carrier, a suitably driven driving means thereon, a spindle carrying a drill point and slidably mounted through the driving means and keyed thereto and removable from the driving means, an arm carried by the spindle, a guide oblique to the travel of the drill carrier engaged by the arm for moving the spindle longitudinally and a support for supporting work in the path of the drill point.

4. A boring machine comprising a suitably mounted traveling drill carrier, bearing brackets thereon, a driving roller journaled in the bearing brackets, a suitably driven belt engaged by the driving roller during a portion of the travel of the drill carrier, spring pressed rollers bearing against the belt opposite the driving roller, a spindle slidably mounted through the driving roller, means for moving the spindle longitudinally, a drill point carried by the spindle, and a work support for supporting work in the path of the drill point.

5. A boring machine, comprising a suitably mounted traveling drill carrier, a spindle slidably mounted therein, means for rotating the spindle, a sleeve loosely mounted on the spindle, a roller carried by the sleeve, a channel guide for the roller formed of a pair of pivotally mounted sections having a segmental gear connection with each other, an adjusting means for swinging one of the sections of the guide, a drill point carried by the spindle, and a work support for supporting work in the path of the drill points.

6. In a boring machine, a work support for supporting strips of lumber or the like, a traveling drill carrier adapted to operate upon the work, a pair of dogs pivotally mounted on the drill carrier extending obliquely in different directions, one extending forwardly and the other extending rearwardly in the direction of travel of the drill carrier, a spring for drawing the dogs together into engagement with the work, the forwardly extending dog having a projection beyond its pivotal connection, and a stop in the path of the projection of the dog for moving the forwardly extending dog away from the work as the drill carrier comes into position for engagement with the work, the spring causing said dog to forcibly engage the work when its projection leaves the stop.

7. In a boring machine, a work support for supporting strips of lumber or the like, a series of traveling drill carriers adapted to operate upon the work, a dog pivotally mounted on the drill carrier, a spring for holding the dog in engagement with the work, said dog having a projection beyond its pivotal connection, and a stop on the projection of the dog for moving the dog away from the work as the drill carrier comes into position for engagement with the work, the spring causing the dog to forcibly engage the work when its projection leaves the stop.

In testimony whereof, I affix my signature, in presence of two witnesses.

WILLIAM P. ORTH.

Witnesses:
R. S. C. CALDWELL,
KATHERINE HOLT.

Copies of this patent may be obtained for five cents each, by addressing the "Commissioner of Patents, Washington, D. C."